(12) United States Patent
Seo et al.

(10) Patent No.: US 11,327,439 B2
(45) Date of Patent: May 10, 2022

(54) HOLOGRAPHIC DISPLAY APPARATUS AND HOLOGRAPHIC DISPLAY METHOD FOR PROVIDING ENHANCED IMAGE QUALITY

(71) Applicant: SAMSUNG ELECTRONICS CO., LTD., Suwon-si (KR)

(72) Inventors: Wontaek Seo, Yongin-si (KR); Hongseok Lee, Seongnam-si (KR); Juwon Seo, Osan-si (KR); Hoon Song, Yongin-si (KR); Jungkwuen An, Cheonan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 279 days.

(21) Appl. No.: 16/596,933

(22) Filed: Oct. 9, 2019

(65) Prior Publication Data

US 2020/0041958 A1    Feb. 6, 2020

Related U.S. Application Data

(60) Continuation of application No. 16/114,273, filed on Aug. 28, 2018, now Pat. No. 10,969,744, which is a
(Continued)

(30) Foreign Application Priority Data

May 1, 2015    (KR) .......................... 10-2015-0062273

(51) Int. Cl.
*G03H 1/22*    (2006.01)
*G03H 1/26*    (2006.01)
(Continued)

(52) U.S. Cl.
CPC ......... *G03H 1/2294* (2013.01); *G03H 1/0486* (2013.01); *G03H 1/0808* (2013.01);
(Continued)

(58) Field of Classification Search
CPC .. G03H 1/2294; G03H 1/0486; G03H 1/0808; G03H 1/0841; G03H 1/2645;
(Continued)

(56) References Cited

U.S. PATENT DOCUMENTS 8,659,810 B2    2/2014    Joo
8,687,253 B2    4/2014    Yu et al.
(Continued)

FOREIGN PATENT DOCUMENTS

CN    101617261 A    12/2009
CN    101842752 A    9/2010
(Continued)

OTHER PUBLICATIONS

Communication dated Jul. 1, 2021, issued by the Korean Intellectual Property Office in Korean Patent Application No. 10-2015-0062273.
(Continued)

*Primary Examiner* — Derek S. Chapel
*Assistant Examiner* — Adam W Booher
(74) *Attorney, Agent, or Firm* — Sughrue Mion, PLLC

(57) ABSTRACT

Provided is a holographic display apparatus including a light source configured to emit light; a spatial light modulator configured to sequentially generate hologram patterns for modulating the light and to sequentially reproduce frames of hologram images based on the hologram patterns; and a controller configured to provide hologram data signals to the spatial light modulator, the hologram data signals being used to sequentially generate the hologram patterns. The controller is configured to further provide, to the spatial light modulator, diffraction pattern data signals for forming periodic diffraction patterns for adjusting locations of the hologram images to be reproduced on a hologram image plane, the diffraction pattern data signals being configured to move
(Continued)

the periodic diffraction patterns on the spatial light modulator along a predetermined direction for each of the frames.

19 Claims, 9 Drawing Sheets

Related U.S. Application Data division of application No. 15/000,601, filed on Jan. 19, 2016, now Pat. No. 10,088,803.

(51) Int. Cl.
*G03H 1/08* (2006.01)
*G03H 1/30* (2006.01)
*G03H 1/04* (2006.01)
*G02B 5/32* (2006.01)

(52) U.S. Cl.
CPC ......... *G03H 1/0841* (2013.01); *G03H 1/2645* (2013.01); *G02B 5/32* (2013.01); *G03H 2001/0825* (2013.01); *G03H 2001/2271* (2013.01); *G03H 2001/2297* (2013.01); *G03H 2001/266* (2013.01); *G03H 2001/303* (2013.01); *G03H 2210/454* (2013.01); *G03H 2225/35* (2013.01); *G03H 2226/05* (2013.01)

(58) Field of Classification Search
CPC .......... G03H 1/22; G03H 1/2249; G03H 1/26; G03H 2001/0825; G03H 2001/2271; G03H 2001/2297; G03H 2001/266; G03H 2001/303; G03H 2001/2252; G03H 2001/2263; G03H 2001/2655; G03H 2210/454; G03H 2225/35; G03H 2226/05; G02B 5/32
See application file for complete search history.

(56) References Cited

U.S. PATENT DOCUMENTS

| | | |
|---|---|---|
| 2009/0002787 A1 | 1/2009 | Cable |
| 2009/0147330 A1 | 6/2009 | Seo et al. |
| 2009/0316240 A1 | 12/2009 | Hara |
| 2010/0039686 A1 | 2/2010 | Nishiwaki et al. |
| 2010/0149313 A1 | 6/2010 | Kroll et al. |
| 2010/0214634 A1 | 8/2010 | Kroll et al. |
| 2010/0277566 A1 | 11/2010 | Cable et al. |
| 2012/0200901 A1 | 8/2012 | Dubois et al. |

FOREIGN PATENT DOCUMENTS

| | | |
|---|---|---|
| JP | 11-14937 A | 1/1999 |
| JP | 2008-544307 A | 12/2008 |
| JP | 2009-036791 A | 2/2009 |
| JP | 2011-503650 A | 1/2011 |
| KR | 10-2009-0132542 A | 12/2009 |
| KR | 10-2010-0017869 A | 2/2010 |
| KR | 10-2010-0017870 A | 2/2010 |
| WO | 2008/099585 A1 | 8/2008 |
| WO | 2009/056876 A2 | 5/2009 |

OTHER PUBLICATIONS

Communication dated Dec. 23, 2019 issued by the State intellectual Property Office of People's Republic of China in counterpart Chinese Application No. 201610236504.2.
Geeyoung Sung, et al., "Enhancement of the Effective Viewing Window for a Holographic Display with an Amplitude-only SLM", Stereoscopic Displays and Applications XXVI, Proc. of SPIE-IS &T Electronic Imaging, vol. 9391, Mar. 16, 2016, pp. 939102-1-939102-8, XP060050681.
Michal Makowski, et al., "Color image projection based on Fourier holograms", Optics Letters, Optical Society of America, vol. 35, No. 8, Apr. 15, 2010, pp. 1227-1229, XP001553234.
Communication dated Oct. 11, 2016, issued by the European Patent Office in counterpart European application No. 16166067.5.

Frame 1

Frame 2

HOLOGRAPHIC DISPLAY APPARATUS AND HOLOGRAPHIC DISPLAY METHOD FOR PROVIDING ENHANCED IMAGE QUALITY

CROSS-REFERENCE TO RELATED APPLICATION

This application is a continuation of U.S. application Ser. No. 16/114,273, filed Aug. 28, 2018, which is a divisional of U.S. application Ser. No. 15/000,601, filed Jan. 19, 2016, which issued as U.S. Pat. No. 10,088,803 and claims priority from Korean Patent Application No. 10-2015-0062273, filed on May 1, 2015, in the Korean Intellectual Property Office, the disclosure of which is incorporated herein in its entirety by reference.

BACKGROUND

1. Field

Apparatuses and methods consistent with exemplary embodiments relate to a holographic display apparatus and a holographic display method, and more particularly to, a holographic display apparatus and a holographic display method whereby the image quality of a hologram image reproduced via an off-axis technique is enhanced.

2. Description of the Related Art

Methods of realizing three-dimensional (3D) images such as glasses-type methods and non-glasses-type methods are widely used. Examples of glasses-type methods include deflected glasses-type methods and shutter glasses-type methods, and examples of the non-glasses-type methods include lenticular methods and parallax barrier methods. These methods use binocular parallax, and as a result, it is difficult to increase the number of viewpoints. In addition, these methods make the viewers feel tired due to the difference between the depth perceived by the brain and the focus of the eyes.

Recently, holographic display methods, which are 3D image display methods capable of making the depth perceived by the brain consistent with the focus of the eyes and providing full parallax, have been gradually put to practical use. According to a holographic display technique, when light is irradiated onto a hologram pattern having recorded thereon an interference pattern obtained by interference between object light reflected from an original object and the light, the light is diffracted and an image of the original object is reproduced. When a currently commercialized holographic display technique is used, a computer-generated hologram (CGH), rather than a hologram pattern obtained by directly exposing an original object to light, is provided as an electric signal to a spatial light modulator. Then, the spatial light modulator forms a hologram pattern and diffracts light according to the input CGH signal, thereby generating a 3D image.

SUMMARY

According to an aspect of an exemplary embodiment, there is provided a holographic display apparatus including: a light source configured to emit light; a spatial light modulator configured to sequentially generate hologram patterns for modulating the light and to sequentially reproduce frames of hologram images based on the hologram patterns; and a controller configured to provide hologram data signals to the spatial light modulator, the hologram data signals being used to sequentially generate the hologram patterns, wherein the controller is configured to further provide, to the spatial light modulator, diffraction pattern data signals for forming periodic diffraction patterns for adjusting locations of the hologram images to be reproduced on a hologram image plane, the diffraction pattern data signals being configured to move the periodic diffraction patterns on the spatial light modulator along a predetermined direction for each of the frames.

The hologram images may include a first color image, a second color image, and a third color image, the first color image, the second color image and the third color image having different colors from each other, and the periodic diffraction patterns may include a first periodic diffraction pattern for adjusting a location of the first color image, a second periodic diffraction pattern for adjusting a location of the second color image, and a third periodic diffraction pattern for adjusting a location of the third color image, the first periodic diffraction pattern, the second periodic diffraction pattern, and the third periodic diffraction pattern having different periods from each other.

The controller may be configured to set the periods of the first, second and third periodic diffraction patterns to be proportional to wavelengths of light of first, second and third colors, respectively.

The hologram images may include a first frame diffraction pattern formed on the spatial light modulator while a hologram image of a first frame is being reproduced and a second frame diffraction pattern formed on the spatial light modulator while a hologram image of a second frame is being reproduced, and the controller may be configured to move the first frame diffraction pattern and the second frame diffraction pattern along the predetermined direction with respect to each other and form the first frame diffraction pattern and the second frame diffraction pattern on the spatial light modulator.

The controller may be configured to move the first frame diffraction pattern and the second frame diffraction pattern along the predetermined direction by distances that are less than a lowest common multiple of periods of the first, second and third periodic diffraction patterns.

When locations of the periodic diffraction patterns are changed at a period of N frames, the controller may be configured to move the first frame diffraction pattern and the second frame diffraction pattern along the predetermined direction by distances that are selected as multiples of a value obtained by dividing the lowest common multiple of the periods of the first, second and third periodic diffraction patterns into N equal parts.

The controller may be configured to determine locations of the periodic diffraction patterns formed on the spatial light modulator according to phases of prism grating functions for generating the diffraction pattern data signals.

The diffraction patterns may include a first frame diffraction pattern formed on the spatial light modulator while the hologram image of a first frame is being reproduced and a second frame diffraction pattern formed on the spatial light modulator while the hologram image of a second frame is being reproduced, and a phase of a prism grating function of the first frame diffraction pattern and a phase of a prism grating function of the second frame diffraction pattern may be different from each other.

The controller may be configured to sequentially change the phases of the prism grating functions while sequentially reproducing the frames of the hologram images.

The controller may be configured to irregularly change the phases of the prism grating functions while sequentially reproducing the frames of the hologram images.

According to another aspect of an exemplary embodiment, there is provided a holographic display method including: sequentially generating, by a spatial light modulator, hologram patterns; and sequentially reproducing frames of hologram images based on the hologram patterns, wherein the spatial light modulator further forms periodic diffraction patterns for adjusting locations of the hologram images to be reproduced on a hologram image plane, and wherein the method further comprises moving the periodic diffraction patterns along a predetermined direction on the spatial light modulator for each of the frames.

The hologram images may include a first color image, a second color image, and a third color image, the first color image, the second color image, and the third color image having different colors from each other, and the periodic diffraction patterns may include a first periodic diffraction pattern for adjusting a location of the first color image, a second periodic diffraction pattern for adjusting a location of the second color image, and a third periodic diffraction pattern for adjusting a location of the third color image, the first periodic diffraction period, the second periodic diffraction period and the third periodic diffraction period having different periods from each other.

The periods of the first, second and third periodic diffraction patterns may be proportional to wavelengths of light of first, second and third colors, respectively.

The hologram images may include a first frame diffraction pattern formed on the spatial light modulator while a hologram image of a first frame is being reproduced and a second frame diffraction pattern formed on the spatial light modulator while a hologram image of a second frame is being reproduced, and the moving may include moving the first frame diffraction pattern and the second frame diffraction pattern along the predetermined direction with respect to each other.

The moving may include moving the first frame diffraction pattern and the second frame diffraction pattern along the predetermined direction by distances that are less than a lowest common multiple of periods of the first through third periodic diffraction patterns.

The method may further include determining locations of the periodic diffraction patterns formed on the spatial light modulator according to phases of prism grating functions for generating diffraction pattern data signals used to generate the periodic diffraction patterns.

The hologram images may include a first frame diffraction pattern formed on the spatial light modulator while a hologram image of a first frame is being reproduced and a second frame diffraction pattern formed on the spatial light modulator while a hologram image of a second frame is being reproduced, and a phase of a prism grating function of the first frame diffraction pattern and a phase of a prism grating function of the second frame diffraction pattern may be different from each other.

The method may further include sequentially changing the phases of the prism grating functions while the frames of the hologram images are sequentially reproduced.

The method may further include irregularly changing the phases of the prism grating functions while the frames of the hologram images frames are sequentially reproduced.

According to an aspect of another exemplary embodiment, there is provided a holographic display apparatus including: a light source configured to emit light; a spatial light modulator configured to generate a hologram pattern for reproducing a hologram image comprising a first color image, a second color image, and a third color image by modulating the light, the first color image, the second color image and the third color image having different colors from each other; and a controller configured to provide a hologram data signal to the spatial light modulator, the hologram pattern being generated based on the hologram data signal, wherein the controller is configured to further provide, to the spatial light modulator, a diffraction pattern data signal for forming a periodic diffraction pattern for adjusting a location of the hologram image to be reproduced, and wherein the controller is configured to determine a period of the periodic diffraction pattern based on a wavelength of light of the first color image.

The holographic display apparatus may further include a distance measurer configured to measure a distance between an observer and the spatial light modulator, and the controller may be configured to adjust a depth of the hologram image to be reproduced based on the distance between the observer and the spatial light modulator such that a chromatic dispersion of the second and third color images is smaller than an allowed circle of confusion formed by the periodic diffraction pattern.

The controller may be configured to generate the hologram data signal such that locations of the second and third color images are consistent with a location of the first color image at a depth at which the hologram image is reproduced.

The hologram pattern may be configured to move the second color image in a direction opposite to the chromatic dispersion of the second color image so as to offset the chromatic dispersion of the second color image caused by the diffraction pattern at the depth at which the hologram image is reproduced.

The hologram pattern may be configured to move the third color image in a direction opposite to the chromatic dispersion of the third color image so as to offset the chromatic dispersion of the third color image caused by the diffraction pattern at the depth at which the hologram image is reproduced.

According to an aspect of another exemplary embodiment, there is provided a holographic display apparatus including: a light source configured to emit light; a spatial light modulator configured to reproduce a hologram image by modulating an amplitude of the light based on an amplitude modulation value; and a controller configured to extract the amplitude modulation value from hologram data of the hologram image to be reproduced and to provide the amplitude modulation value to the spatial light modulator, wherein the hologram data is expressed as a complex number, and the controller is further configured to select one of a positive amplitude part and a negative amplitude part in a real part of the hologram data expressed as the complex number, provide an absolute value of the selected one of the positive amplitude part and the negative amplitude part to the spatial light modulator as the amplitude modulation value, and process a remaining portion of the real part of the hologram data that is not selected as 0.

The controller may be further configured to select the positive amplitude part and process the negative amplitude part as 0 while reproducing a hologram image of a first frame, and to select the negative amplitude part and process the positive amplitude part as 0 while reproducing a hologram image of a second frame subsequent to the first frame.

The controller may be further configured to remove a high spatial frequency component of the extracted amplitude modulation value via a low pass filter before providing the extracted amplitude modulation value to the spatial light modulator.

According to an aspect of another exemplary embodiment, there is provided a holographic display apparatus including: a light source configured to emit light; a spatial light modulator configured to reproduce a hologram image by modulating an amplitude of the light based on an amplitude modulation value; and a controller configured to extract the amplitude modulation value from hologram data of the hologram image to be reproduced and provide the amplitude modulation value to the spatial light modulator, wherein the hologram data is expressed as a complex number, and the controller is configured to calculate the amplitude modulation value by adding at least one of a value of a real part of the hologram data and a value of an imaginary part of the hologram data to an absolute value of the hologram data expressed as the complex number.

The amplitude modulation value may be a sum of the absolute value of the hologram data expressed as the complex number and the value of the real part of the hologram data.

The amplitude modulation value may be a sum of the absolute value of the hologram data expressed as the complex number and the value of the imaginary part of the hologram data.

The controller may be configured to calculate the amplitude modulation value by adding a value obtained by multiplying the value of the real part of the hologram data expressed as the complex number and a first coefficient, a value obtained by multiplying the value of the imaginary part of the hologram data and a second coefficient, and a value obtained by multiplying the absolute value of the hologram data and a third coefficient.

The third coefficient may have a value other than 0 and values of the first and second coefficients are selected such that the amplitude modulation value is greater than 0 at all coordinates.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
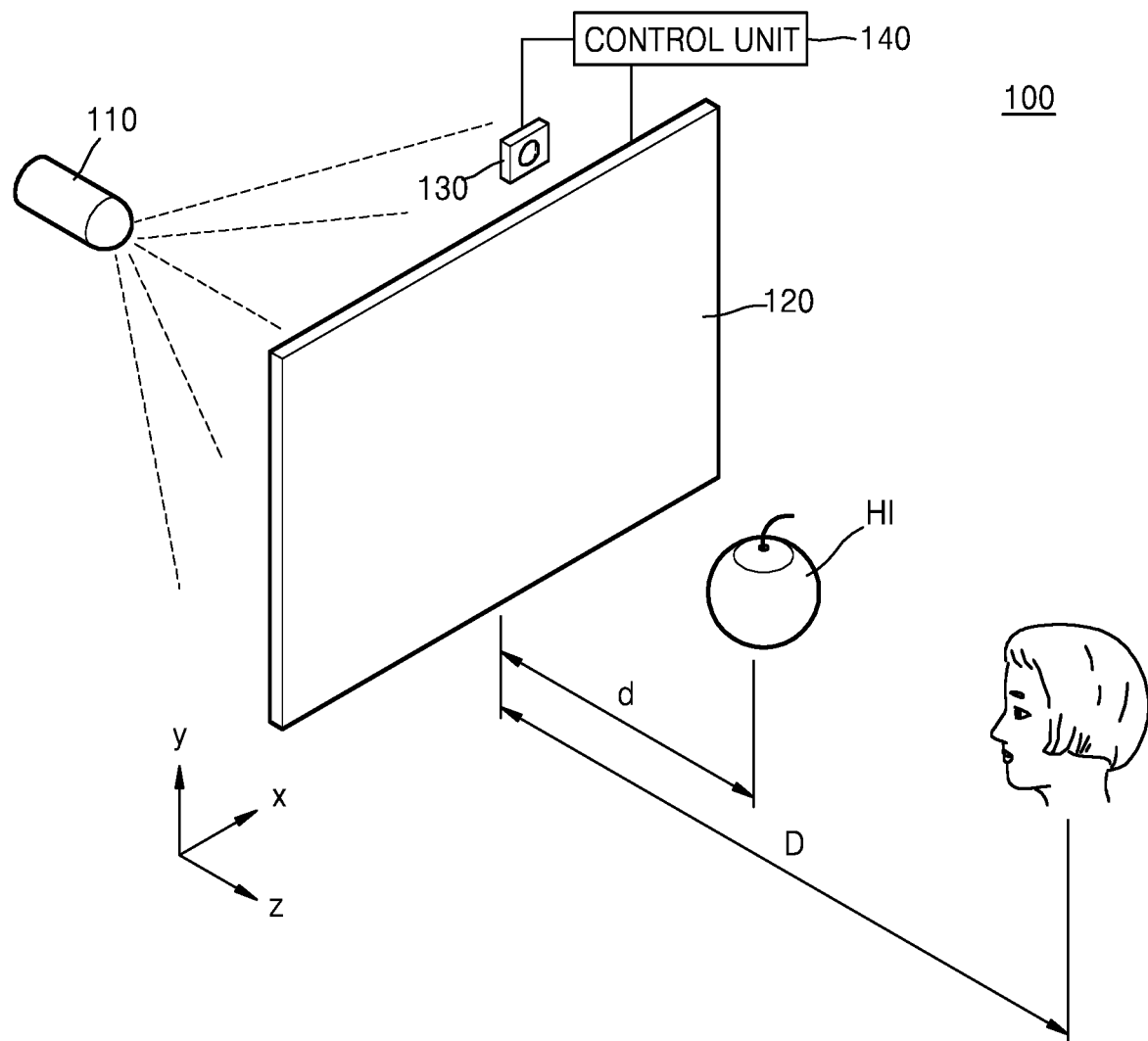
FIG. 1 is a conceptual diagram schematically showing a structure of a holographic display apparatus according to an exemplary embodiment.

Hereinafter, with reference to the accompanying drawings, a holographic display apparatus and method for providing enhanced image quality will be described in detail. Like reference numerals refer to like elements throughout, and in the drawings, sizes of elements may be exaggerated for clarity and convenience of explanation. The exemplary embodiments described below are merely exemplary, and various modifications may be possible from the exemplary embodiments. In a layer structure described below, when a position of an element is described using an expression "above" or "on", the position of the element may include not only the element being "immediately on in a contact manner" but also being "on in a non-contact manner" (e.g., the element is not directly contacting another element). As used herein, the term "and/or" includes any and all combinations of one or more of the associated listed items.

FIG. 1 is a conceptual diagram schematically showing a structure of a holographic display apparatus 100 according to an exemplary embodiment.

Referring to FIG. 1, the holographic display apparatus 100 according to the present exemplary embodiment may include a light source 110 providing light, a spatial light modulator 120 forming a hologram pattern to modulate the light, and a control unit 140 controlling an operation of the spatial light modulator 120. The holographic display apparatus 100 may further include an eye tracking unit 130 (e.g., eye tracker) tracking a pupil location of an observer. The holographic display apparatus 100 may further include a Fourier lens that allows the light modulated by the spatial light modulator 120 to be focused at a predetermined space. The modulated light may be focused at the predetermined space by the Fourier lens, and thus a hologram image may be reproduced in the space. However, if the light source 110 provides condensed light, the Fourier lens may be omitted.

The light source 110 may be a laser source to provide light having a high spatial coherence to the spatial light modulator

120. However, if the light has a certain degree of spatial coherence, since the light may be sufficiently diffracted and modulated by the spatial light modulator 120, a light-emitting diode (LED) or some other light emitting element may alternatively be used as the light source 110. In addition to the LED, any other light sources may be used as long as light having spatial coherence is emitted. Although one light source 110 is illustrated in FIG. 1 for convenience of description, the light source 110 may include an array of a plurality of lasers or LEDs.

The spatial light modulator 120 may form a hologram pattern for diffracting and modulating the light, according to a hologram data signal provided by the control unit 140. The spatial light modulator 120 may use any one of a phase modulator for performing phase modulation, an amplitude modulator for performing amplitude modulation, and a complex modulator performing both phase modulation and amplitude modulation. Although the spatial light modulator 120 of FIG. 1 is a transmissive spatial light modulator, a reflective spatial light modulator may also be used. The transmissive light spatial modulator may use, for example, a semiconductor modulator based on a compound semiconductor such as GaAs, or a liquid crystal device (LCD). The reflective spatial light modulator may use, for example, a digital micromirror device (DMD), a liquid crystal on silicon (LCoS), or a semiconductor modulator.

The eye tracking unit 130 may obtain an image of the observer through a camera, detect the pupils of the observer from the image, and analyze the locations of the pupils. The eye tracking unit 130 may function as a distance measuring unit (e.g., distance measurer) measuring a distance between the observer and the spatial light modulator 120. Thus, the eye tracking unit 150 may track a pupil location change of the observer and a change in the distance between the observer and the spatial light modulator 120 in real time and provide a result of tracking to the control unit 140.

The control unit 140 may be configured to generate the hologram data signal according to the hologram image that is to be provided to the observer, and provide the hologram data signal to the spatial light modulator 120. The control unit 140 may actively control an operation of the spatial light modulator 120 according to the pupil location change of the observer input from the eye tracking unit 130. The control unit 140 may be implemented by using software or a semiconductor chip functioning as the software.

The operation of the holographic display apparatus 100 will now be described below. The control unit 140 may generate and provide the hologram data signal to the spatial light modulator 120. The hologram data signal may be a computer-generated hologram (CGH) signal that is computed to reproduce a target hologram image on a space. The control unit 140 may generate the hologram data signal according to the hologram image that is to be reproduced. The spatial light modulator 120 may form the hologram pattern on a surface of the spatial light modulator 120 according to the hologram data signal provided from the control unit 140. A principle by which the spatial light modulator 120 forms the hologram pattern may be the same as a principle by which, for example, a display panel displays an image. For example, the hologram pattern may be displayed on the spatial light modulator 120 as an interference pattern including information regarding the hologram image that is to be reproduced.

Simultaneously, the light source 110 may provide the light to the spatial light modulator 120. The light may be diffracted and interfered by the hologram pattern formed by the spatial light modulator 120, and thus, a three-dimensional hologram image HI (e.g., hologram image frame) may be reproduced on a predetermined space in front of the spatial light modulator 120. Each of several cross-sections constituting a three-dimensional image on a space may be referred to as a hologram image plane. An average distance between the hologram image plane and the spatial light modulator 120 may be referred to as a depth d. A shape and the depth d of the hologram image HI that is to be reproduced may be determined according to the hologram pattern formed by the spatial light modulator 120. Then, the observer may appreciate the hologram image HI in a location by the depth D away from the spatial light modulator 120.

However, the spatial light modulator 120 that generally performs one of a phase modulation and an amplitude modulation is comprised of an array of a plurality of pixels, and thus, the array of the plurality of pixels function as a lattice. Thus, the light may be diffracted and interfered not only by the hologram pattern formed by the spatial light modulator 120 but also by the pixel lattice configured as the array of the pixels of the spatial light modulator 120. As a result, a plurality of lattice spots may appear on a pupil plane of the observer on which the hologram image HI is collected in a point. The plurality of lattice spots may function as image noise that deteriorates quality of the hologram image HI and makes it inconvenient to appreciate the hologram image HI.

To prevent the plurality of lattice spots from being seen by the observer, the hologram image HI may be reproduced via an off-axis technique in order to prevent a focus of the hologram image HI from overlapping the plurality of lattice spots on the pupil plane. The plurality of lattice spots may be generated due to an internal structure of the spatial light modulator 120 and is unrelated to the hologram pattern, and thus, locations of the plurality of lattice spots are always fixed. However, a location of the focus of the hologram image HI on the pupil plane may be determined according to the hologram pattern, and thus, the hologram pattern may be formed such that the hologram image HI may be reproduced at a location where the plurality of lattice spots are not present. To adjust the location of the focus of the hologram image HI refers to a technique of adjusting a location of the hologram image HI on the hologram image plane.

Figure 2:
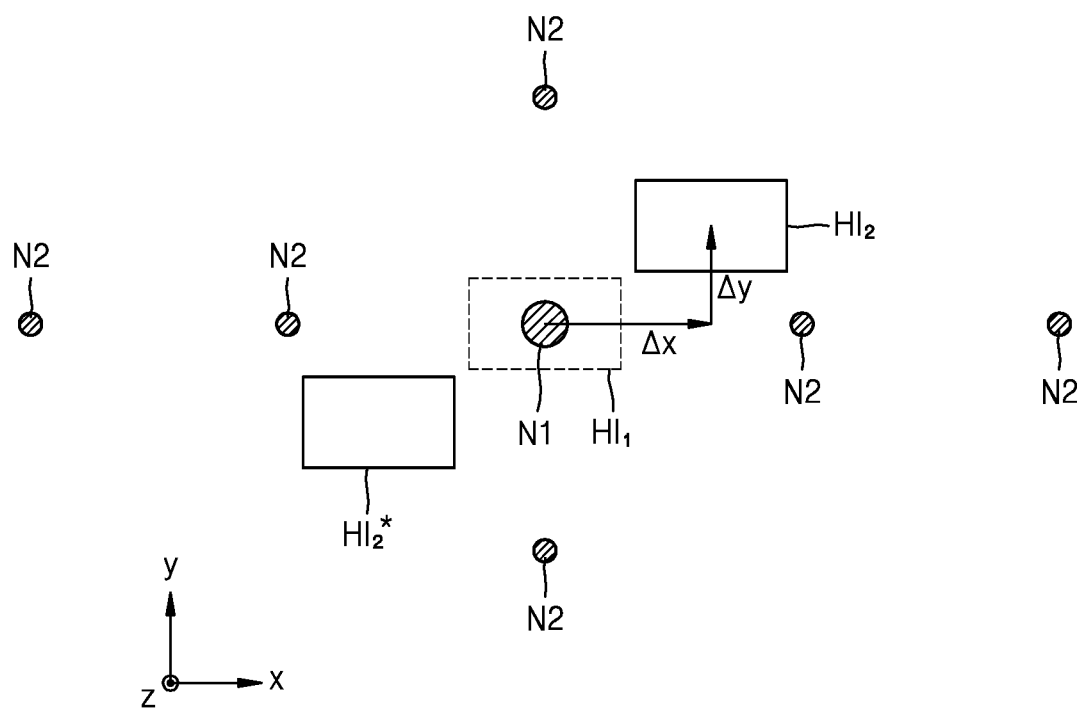
FIG. 2 is a conceptual diagram for explaining a principle of reproducing a hologram image via an off-axis technique.

For example, FIG. 2 is a conceptual diagram for explaining a principle of reproducing a hologram image via an off-axis technique. Referring to FIG. 2, one lattice spot N1 in the center may be generated by light that is transmitted by the spatial light modulator 120 and is not diffracted, and a plurality of lattice spots N2 in the periphery may be generated by light that is diffracted and interferes with a pixel lattice of the spatial light modulator 120. When a hologram pattern is formed without considering the lattice spots N1 and N2, the lattice spots N1 and N2 may be located in the center of a focal area $HI_1$ of a generally reproduced hologram image. Although the focal area $HI_1$ of the hologram image is formed only in the lattice spot N1 in the center of FIG. 2 for convenience of illustration, focal areas of a dark hologram image generated by second or more higher order diffractions of the light may be actually formed in the lattice spots N2. As a result, when a pupil of an observer is located in the focal area $HI_1$ of the hologram image, a noise image of the lattice spot N1 and the hologram image may be seen together.

Therefore, a focal area $HI_2$ of the hologram image may be formed by avoiding the lattice spots N1 and N2 in order to prevent the observer from seeing the lattice spots N1 and N2. For example, as shown in FIG. 2, the focal area $HI_2$ of the hologram image may be formed by moving the original focal area HI$_1$ of the hologram image by Δx in an x-direction and by Δy in a y-direction. Then, when the observer sees the hologram image with the pupil located in the focal area HI$_2$ of the hologram image, a noise image caused by the lattice spot N1 may not be seen or may be small. Meanwhile, when the focal area HI$_2$ of the hologram image is formed by moving the original focal area HI$_1$ of the hologram image, as shown in FIG. 2, a focal area HI$_{2*}$ of a complex conjugate image may be present in a symmetrical location of the focal area HI$_2$ of the hologram image with respect to the lattice spat N1.

To adjust the location of the focal area HI$_2$ of the hologram image as described above, the spatial light modulator 120 may further form a periodic diffraction pattern to adjust the location of the focal area HI$_2$ of the hologram image and a hologram pattern including information regarding the hologram image that is to be reproduced. To this end, the control unit 140 may generate and provide not only a hologram data signal but also a diffraction pattern data signal to the spatial light modulator 120. A traveling direction of the light is deflected by the periodic diffraction pattern formed on the spatial light modulator 120, and thus the location of the focal area HI2 of the hologram image may move from the lattice spots N1 and N2. The periodic diffraction pattern that deflects the traveling direction of light may act as a kind of prism, and thus the periodic diffraction pattern may be referred to as prism grating. A moving amount of the location of the focal area HI$_2$ of the hologram image may be determined according to a period of the diffraction pattern.

Figure 3:
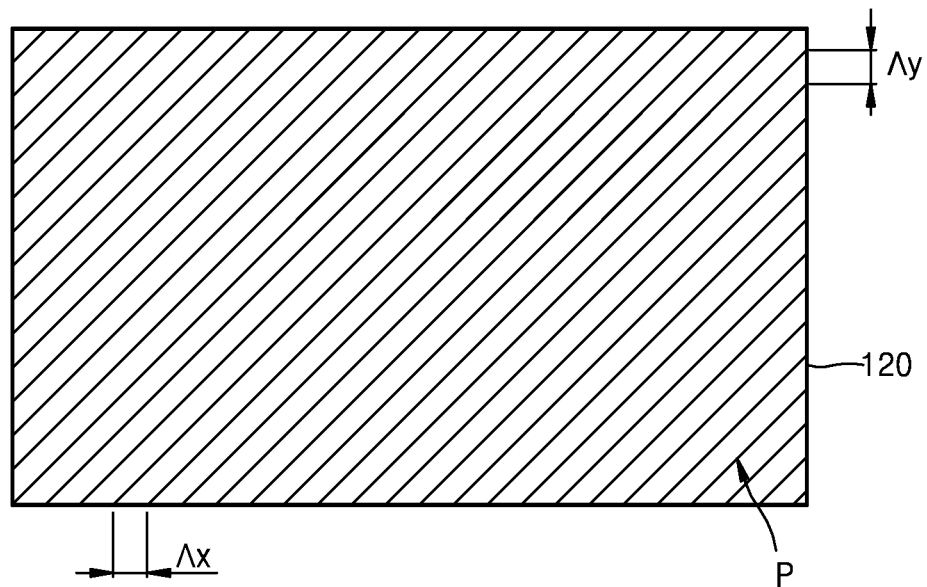
FIG. 3 is an exemplary diagram of a periodic diffraction pattern formed on a spatial light modulator so as to reproduce a hologram image via an off-axis technique.

For example, FIG. 3 is an exemplary diagram of a diffraction pattern P formed on the spatial light modulator 120 so as to form the focal area HI$_2$ of a hologram image via an off-axis technique. Although only the diffraction pattern P is illustrated in FIG. 3 for convenience of illustration, the diffraction pattern P and a hologram pattern may be formed together on the spatial light modulator 120. As shown in FIG. 3, the diffraction pattern P may have a period Λx in the x-direction and a period Λy in the y-direction. In this regard, the period Λx in the x-direction may be a gap between lattice lines constituting the diffraction pattern P in the x-direction, and the period Λy in the y-direction may be a gap between the lattice lines constituting the diffraction pattern P in the y-direction. The periods Λx and Λy may be determined as shown in Equation 1 below according to a moving distance Λx, Λy of the focal area HI2 of the hologram image on a pupil plane on which the focal area HI2 of the hologram image is formed, a distance D from the spatial light modulator 120 to a view zone, and a wavelength λ of light.

$$\Lambda_x = \frac{\lambda D}{\Delta x}, \Lambda_y = \frac{\lambda D}{\Delta y}$$ [Equation 1]

Meanwhile, the light source 110 may provide white light including red light, green light, and blue light to realize a color hologram image. The hologram pattern formed on the spatial light modulator 120 may include a component for diffracting the red light to reproduce a red hologram image, a component for diffracting the green light to reproduce a green hologram image, and a component for diffracting the blue light to reproduce a blue hologram image. The red hologram image, the green hologram image, and the blue hologram image are reproduced on a same location of a hologram image plane, thereby realizing the color hologram image.

As shown in Equation 1 above, the periods Λx and Λy of the diffraction pattern P are dependent on the wavelength λ of the light, and thus the diffraction pattern P may include three diffraction patterns having different periods when the color hologram image is realized. For example, the diffraction pattern P may include a first periodic diffraction pattern to adjust a location of the red hologram image, a second periodic diffraction pattern to adjust a location of the green hologram image, and a third periodic diffraction pattern to adjust a location of the blue hologram image. To coincidently reproduce the red hologram image, the green hologram image, and the blue hologram image on the same location of the hologram image plane, the first through third diffraction patterns may have different periods. For example, since the moving distance Λx, Λy of the focal area HI$_2$ of the red hologram image, the green hologram image, and the blue hologram image on the pupil plane and the distance D from the spatial light modulator 120 to the view zone are common values, periods of the first through third diffraction patterns may be proportional to only the wavelength λ of the light of the red hologram image, the green hologram image, and the blue hologram image.

Figure 4:
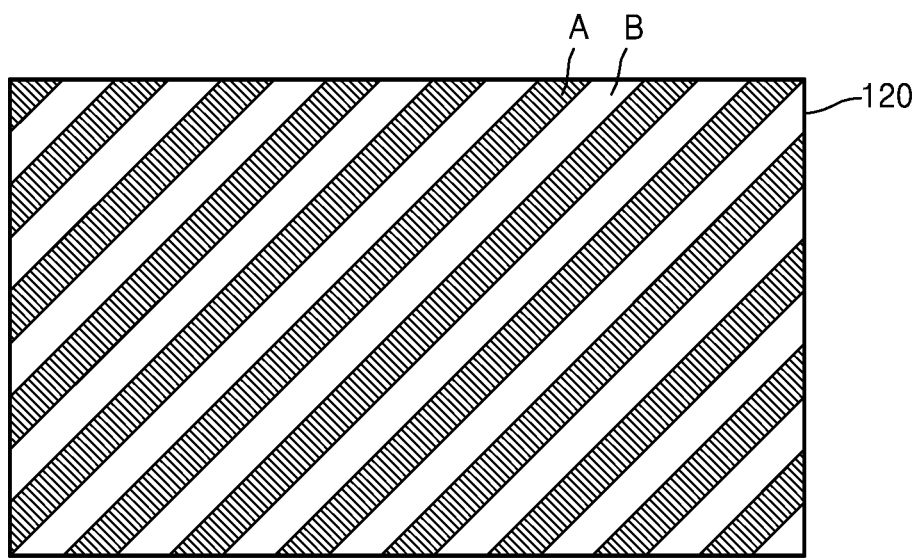
FIG. 4 is an exemplary diagram of Moire noise generated when a plurality of periodic diffraction patterns having different periods cause beating.

Although the diffraction pattern P is exemplarily described as having one period in FIG. 3 for convenience of description, the first through third diffraction patterns having different periods may be formed together on the spatial light modulator 120. However, when a plurality of diffraction patterns having different periods are simultaneously formed in the spatial light modulator 120, beating may occur. For example, respective lattice lines of the first through third diffraction patterns may be densely disposed in a partial area on the spatial light modulator 120 and may be sparsely disposed in another partial area. As a result, when the first through third diffraction patterns simultaneously have strong intensity at a point, white lines may be generated, whereas when the first through third diffraction patterns simultaneously have weak intensity at another point, black lines may be generated. Thus, white and black lines may be alternately cyclically generated on the spatial light modulator 120 and the reproduced hologram image. A period in which white and black lines are alternately generated may be the least common multiple (or an approximate value closest to the least common multiple) of periods of the first through third diffraction patterns. When the period where white and black lines are alternately generated is greater than a resolution power of the observer's eye, image noise such as slant lines may be seen, which is referred to as Moire noise. For example, FIG. 4 is an exemplary diagram of Moire noise caused by beating generated by first through third periodic diffraction patterns having different periods. In FIG. 4, areas (A) are dark areas including black lines, and areas (B) are bright areas including white lines.

As a method of reducing the Moire noise, white and black lines may be generally averaged by changing locations of the white and black lines on the spatial light modulator 120. The locations of the white and black lines of the Moire noise may be determined according to locations of respective lattice lines of the first through third periodic diffraction patterns. Thus, the locations of the white and black lines of the Moire noise may be changed over time by changing a location of the diffraction pattern P formed on the spatial light modulator 120 over time.

Figure 5A:
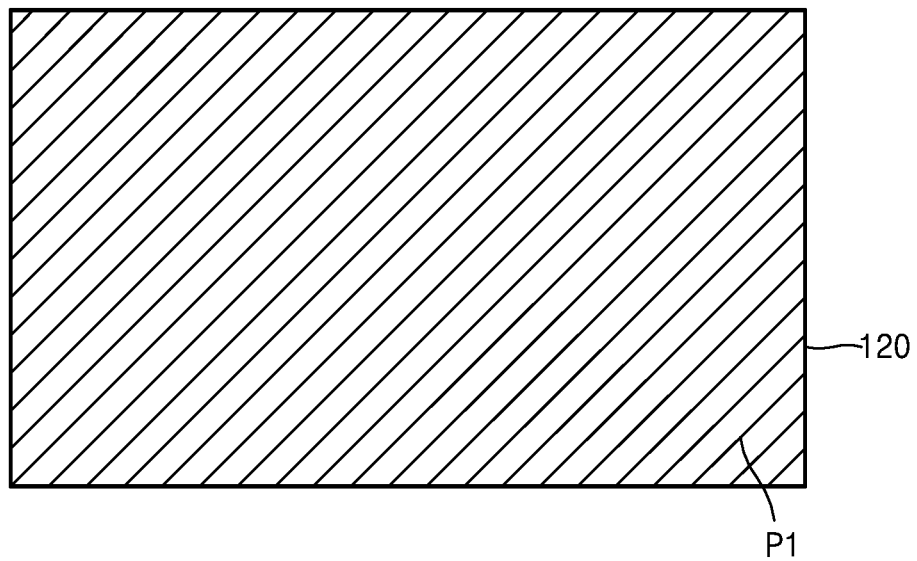
FIGS. 5A, 5B and 5C are exemplary diagrams for describing a holographic display method whereby locations of diffraction patterns are moved horizontally according to frames so as to reduce Moire noise, according to an exemplary embodiment.
Figure 5B:
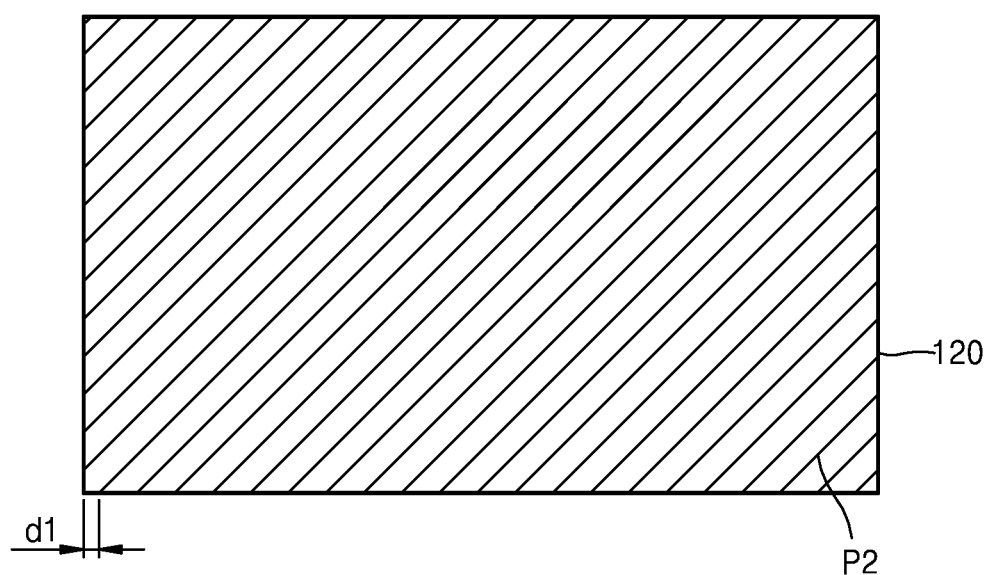
Figure 5C:
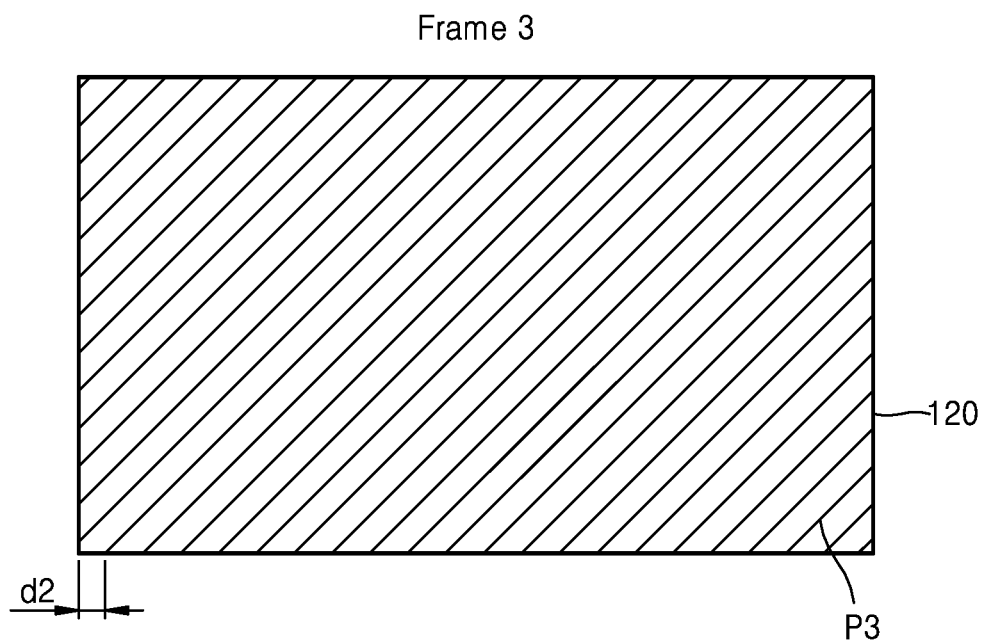

For example, FIGS. 5A, 5B and 5C are exemplary diagrams for describing a holographic display method that horizontally moves locations of diffraction patterns P1, P2, and P3 according to frames so as to reduce Moire noise, according to an exemplary embodiment. Although only the diffraction patterns P1, P2, and P3 are illustrated in FIGS. 5A through 5C for convenience of description, the diffraction patterns P1, P2, and P3 and hologram patterns may be simultaneously formed together on the spatial light modulator 120. That is, the spatial light modulator 120 may sequentially form and display a plurality of hologram patterns to sequentially reproduce hologram images of a plurality of frames. For example, the spatial light modulator 120 may display a first hologram pattern for reproducing a hologram image of a first frame on the first frame and then display a second hologram pattern for reproducing a hologram image of a second frame on the second frame. Although the diffraction patterns P1, P2, and P3 are illustrated for respective frames in FIGS. 5A through 5C for convenience of description, the diffraction patterns P1, P2, and P3 may actually include first through third periodic diffraction patterns having different periods to respectively move a red hologram image, a green hologram image, and a blue hologram image.

The spatial light modulator 120 may form and display periodic diffraction patterns used to adjust a location of a hologram image to be reproduced simultaneously with the displaying of a hologram pattern in each frame. In this regard, to reduce Moire noise, as shown in FIGS. 5A through 5C, the spatial light modulator 120 may horizontally move and display the diffraction patterns P1, P2, and P3 for each frame. For example, a location of the diffraction pattern P2 formed by the spatial light modulator 120 in the second frame may be horizontally moved to the right by d1 compared to a location of the diffraction pattern P1 formed by the spatial light modulator 120 in the first frame. A location of the diffraction pattern P3 in a third frame may be horizontally moved to the right by d2 compared to the location of the diffraction pattern P1 in the first frame. If the locations of the diffraction patterns P1, P2, and P3 are changed for each frame, since locations of white and black lines of Moire noise are changed for each frame, white and black lines may be generally averaged. Thus, white and black lines may be averaged during the plurality of frames, thereby reducing Moire noise.

The distance d1 of the diffraction patterns P1, P2, and P3 that horizontally move during each frame may be constant. As described above, a period in which white and black lines are alternately generated may be the least common multiple (or an approximate value closest to the least common multiple) of periods of first through third diffraction patterns for red, green, and blue hologram images. To reduce Moire noise, the distance d1 of the diffraction patterns P1, P2, and P3 that horizontally move during each frame may be less than that during the period that white and black lines are alternately generated. For example, when the period that white and black lines are alternately generated is denoted as Prgb, if the locations of the diffraction patterns P1 and P2 are changed every two frames, d1=Prgb/2. If d1=Prgb, since locations of white and black lines are the same in all frames, white and black lines may not be averaged. If the locations of the diffraction patterns P1, P2, and P3 are changed every N frames, the distance d1 of the diffraction patterns P1, P2, and P3 that horizontally move for each frame may be Prgb/N.

However, according to design considerations, the diffraction patterns P1, P2, and P3 may be horizontally moved during each frame at irregular intervals. Although the diffraction patterns P1, P2, and P3 are horizontally moved in a constant direction in FIGS. 5A through 5C, the diffraction patterns P1, P2, and P3 may be horizontally moved in an irregular fashion. For example, when the locations of the diffraction patterns P1, P2, and P3 are changed at a period of N frames, the diffraction patterns P1, P2, and P3 may be horizontally irregularly moved to the right and left at an interval having one value among multiples of a value by dividing the period Prgb where white and black lines are alternately generated (or the least common multiple of periods of the first through third periodic diffraction patterns) into N equal parts.

The operation of the spatial light modulator 120 may be controlled by the control unit 140. For example, the control unit 140 may generate and provide a hologram data signal of a hologram pattern that is to be formed on the spatial light modulator 120 and a diffraction pattern data signal for the periodic diffraction patterns P1, P2, and P3 to the spatial light modulator 120. In this regard, the control unit 140 may generate and provide the diffraction pattern data signal to the spatial light modulator 120 such that the diffraction patterns P1, P2, and P3 may be horizontally moved for each frame as described above.

Figure 6:
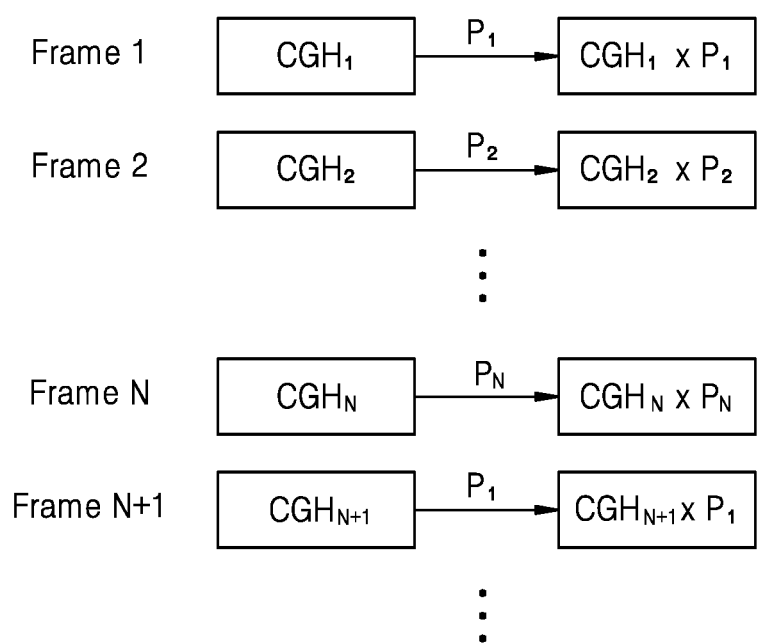
FIG. 6 is an exemplary diagram of an operation in which a control unit generates hologram data signals and diffraction pattern data signals so as to horizontally move locations of diffraction patterns according to frames.

For example, FIG. 6 is an exemplary diagram of an operation in which the control unit 140 generates hologram data signals $CGH_1$, $CGH_2$, ..., $CGH_N$, $CGH_{N+1}$ and diffraction pattern data signals so as to horizontally move locations of diffraction patterns P1, P2, ..., PN at a period of N frames. Referring to FIG. 6, the control unit 140 may generate the hologram data signal $CGH_1$ including information of a hologram pattern for reproducing a hologram image of a first frame. For example, the control unit 140 may generate the hologram data signal $CGH_1$ using fast Fourier transform (FFT) algorithm. The control unit 140 may generate the diffraction pattern data signal of the first frame diffraction pattern P1 formed on the spatial light modulator 120 while reproducing the hologram image of the first frame. The diffraction pattern data signal may be generated using a prism grating function indicating the diffraction pattern, such as the prism grating function represented by Equation 2 shown below:

$$F(x,y) = \exp[j(2\pi f_x x + 2\pi f_y y + \varphi_i)] \quad \text{[Equation 2]}$$

In Equation 2 above, x and y denote coordinates on the spatial light modulator 120. fx and fy denote spatial frequencies of x and y axis directions, respectively, may be the same as reciprocal numbers of the periods $\Lambda x$, $\Lambda y$ of the diffraction patterns, and may be expressed according to Equation 3 shown below:

$$f_x = \frac{1}{\Lambda_x} = \frac{\Delta x}{\lambda D}, \quad f_y = \frac{1}{\Lambda_y} = \frac{\Delta y}{\lambda D} \quad \text{[Equation 3]}$$

$\varphi_i$ denotes a phase of the prism grating function of the diffraction pattern in an ith frame. A location of the diffraction pattern formed on the spatial light modulator 120 may be determined according to the phase of the prism grating function of Equation 2 above. Thus, the diffraction pattern may be horizontally moved on the spatial light modulator 120 by changing a value of $\varphi_i$ for each frame. For example, if the locations of the diffraction patterns P1, P2, ..., PN are horizontally moved sequentially at the period of N frames, a value of $\varphi_i$ in the ith frame may be expressed according to Equation 4 shown below:

$$\varphi_i = \frac{2\pi}{N}(i-1) \quad \text{[Equation 4]}$$

Referring to FIG. 6, the control unit 140 may generate the diffraction pattern data signal of the first frame using the above-described prism grating function. For example, the phase of the prism grating function of the first frame diffraction pattern P1 may be 0. That is, a phase of a prism grating function of each of first through third diffraction patterns of the first frame diffraction pattern P1 may be 0. Thereafter, the control unit 140 may provide the hologram data signal CGH$_1$ and the diffraction pattern data signal of the first frame to the spatial light modulator 120. For example, a final signal that the control unit 140 provides to the spatial light modulator 120 may be expressed as a multiplication of the hologram data signal CGH$_1$ and the diffraction pattern data signal. The spatial light modulator 120 may form and display a hologram pattern and the first frame diffraction pattern P1 according to the signal provided by the control unit 140.

In a second frame, the control unit 140 may generate the hologram data signal CGH$_2$ including information regarding a hologram pattern for reproducing a hologram image of a second frame and may generate the diffraction pattern data signal of the second frame diffraction pattern P2 formed on the spatial light modulator 120 while reproducing the hologram image of the second frame. In the second frame, a phase of a prism grating function of the diffraction pattern P2 may be $2\pi/N$. That is, a phase of a prism grating function of each of the first through third diffraction patterns of the second frame diffraction pattern P2 may be $2\pi/N$. Accordingly, a location of the second frame diffraction pattern P2 formed on the spatial light modulator 120 may be horizontally moved with respect to the first frame diffraction pattern P1.

As described above, the control unit 140 may generate and provide the hologram data single CGH$_N$ of an Nth frame and the diffraction pattern data signal of a diffraction pattern PN to the spatial light modulator 120. Thereafter, the control unit 140 may generate the same diffraction pattern data signal as the first frame diffraction pattern P1 again in an N+1th frame and may provide the diffraction pattern data signal and the hologram data single CGH$_{N+1}$ of an N+1th frame to the spatial light modulator 120.

In FIG. 6, hologram images reproduced in respective frames may be the same when the hologram images are still images. That is, the hologram data signals CGH$_1$, CGH$_2$, . . . , CGH$_N$, CGH$_{N+1}$ may be the same in all frames. When the hologram images reproduced in respective frames are moving images, the hologram images may be different. That is, the hologram data signals CGH$_1$, CGH$_2$, . . . , CGH$_N$, CGH$_{N+1}$ may be different in all frames.

According to an exemplary embodiment, the control unit 140 sequentially changes the phases of the prism grating functions according to Equation 4 above while sequentially reproducing hologram images of a plurality of frames in the above-described example, although exemplary embodiments are not limited thereto. For example, the control unit 140 may arbitrarily select a value of i in Equation 4 irrespective of a frame sequence. In this case, the control unit 140 may irregularly change the phases of the prism grating functions while sequentially reproducing the hologram images of the plurality of frames. Accordingly, the diffraction patterns P1, P2, . . . , PN may be horizontally moved at irregular intervals for each frame.

As another method of reducing Moire noise, only one of the first through third diffraction patterns may be used. As described above, Moire noise is caused by beating generated by the first through third periodic diffraction patterns having different periods. Thus, if only one of the first through third diffraction patterns is used to move the hologram images, Moire noise may not occur. For example, the control unit 140 may provide only a hologram data signal of a second periodic diffraction pattern used to adjust a location of a green hologram image to the spatial light modulator 120. Alternatively, the control unit 140 may determine a period of a diffraction pattern based on only a wavelength of light of a red or blue hologram image and generate and provide a hologram data signal to the spatial light modulator 120.

Figure 7:
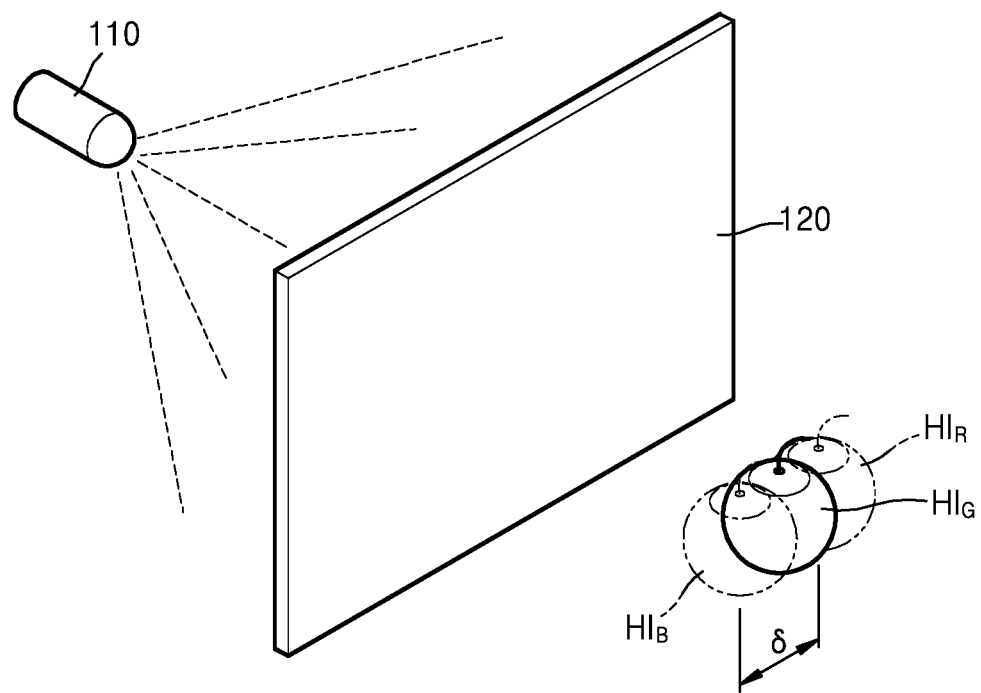
FIG. 7 is an exemplary diagram of chromatic dispersion that occurs in a hologram image when the hologram image is reproduced via an off-axis technique by using one periodic diffraction pattern.

However, in this case, locations of a hologram image plane on which the red, green, and blue hologram images having wavelengths of different light are reproduced are different, and thus chromatic dispersion may occur. For example, FIG. 7 is an exemplary diagram of chromatic dispersion that occurs in a hologram image when the hologram image is reproduced via an off-axis technique by using one periodic diffraction pattern. Referring to FIG. 7, a green hologram image HIG may be reproduced between a blue hologram image HIB and a red hologram image HIR. A chromatic dispersion between the red hologram image HIR and the green hologram image HIG may be $\delta$ having a unit of length. If the chromatic dispersion is sufficiently small, an occurrence thereof may not be recognized. The maximum chromatic dispersion that may not be recognized by an observer may be different according to a size of a circle of confusion (CoC), the distance D between the spatial light modulator 120 and the observer, and the depth d of the reproduced hologram image. For example, if the chromatic dispersion satisfies Equation 5 shown below, the observer may not recognize the occurrence of chromatic dispersion:

$$\delta < \delta_{max} = \frac{D-d}{L_{eye}} \times CoC \qquad \text{[Equation 5]}$$

In Equation 5 above, $L_{eye}$ denotes a distance from an eye lens to a retina and a reference location of the CoC is the retina of the observer. $L_{eye}$ and the CoC are substantially invariable values, and the distance D between the spatial light modulator 120 and the observer may be measured and obtained by the eye tracking unit 130. Thus, the control unit 140 may adjust the depth d of the reproduced hologram image based on the distance D between the spatial light modulator 120 and the observer such that the chromatic dispersion $\delta$ may be less than the maximum chromatic dispersion $\delta_{max}$ that may not be recognized by the observer. For example, the control unit 140 may calculate the depth d of the reproduced hologram image that allows the chromatic dispersion $\delta$ to be smaller than the maximum chromatic dispersion $\delta_{max}$ by using the distance D between the spatial light modulator 120 and the observer provided by the eye tracking unit 130. The control unit 140 may generate and provide a hologram data signal to the spatial light modulator 120 such that the hologram image may be reproduced at the calculated depth d. Thus, the depth d of the hologram image may be changed according to a movement of the observer, thereby preventing the observer from recognizing the occurrence of chromatic dispersion.

Figure 8:
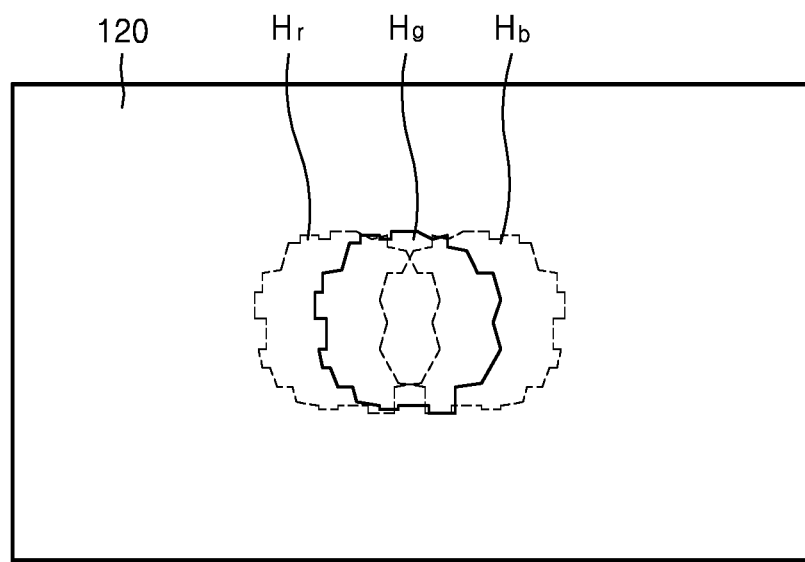
FIG. 8 is an exemplary diagram of hologram patterns formed on a spatial light modulator so as to prevent chromatic dispersion from occurring although one periodic diffraction pattern is used.

When the hologram image is moved by using only one of first through third periodic diffraction patterns, chromatic dispersion may be removed by correcting a location of an original image according to colors. That is, when the hologram image is moved by using only the second periodic diffraction pattern, a location of red hologram data and a location of blue hologram data that are included in the hologram data signal may be corrected such that locations of the red hologram image HIR and the blue hologram image HIB may be consistent with a location of the green hologram image HIG on a hologram image plane. For example, FIG. 8 is an exemplary diagram of hologram patterns $H_r$, $H_g$, and $H_b$ formed on the spatial light modulator 120 so as to prevent chromatic dispersion from occurring although one periodic diffraction pattern is used. Shapes of the hologram patterns $H_r$, $H_g$, and $H_b$ illustrated in FIG. 8 are mere examples, and may be significantly different from the examples shown in FIG. 8 according to various types of conditions, including, for example, a shape, a location, and a depth of a hologram image that is to be reproduced. As shown in FIG. 8, locations of hologram images of respective colors that are to be reproduced may be consistent with each other at a depth (e.g., a hologram image plane) of which the hologram image is reproduced by previously correcting a location of an original image for each color.

Figure 9:
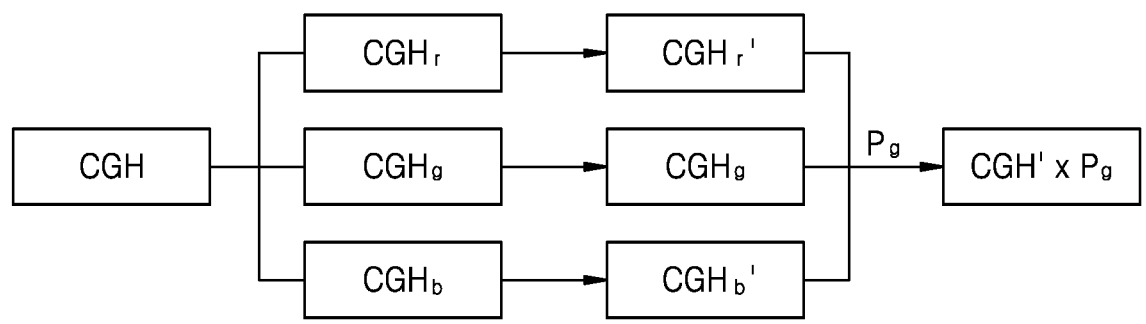
FIG. 9 is an exemplary diagram for describing an operation in which a control unit generates a hologram data signal and a diffraction pattern data signal so as to prevent chromatic dispersion from occurring although one periodic diffraction pattern is used.

To this end, the control unit 140 may generate and provide hologram data to the spatial light modulator 120 such that the locations of hologram images of respective colors that are to be reproduced may be consistent with each other on the hologram image plane. For example, FIG. 9 is an exemplary diagram for describing an operation in which the control unit 140 generates a hologram data signal and a diffraction pattern data signal so as to prevent chromatic dispersion from occurring although one periodic diffraction pattern is used. It is assumed in FIG. 9 that a period of the diffraction pattern is determined based on a green wavelength.

Referring to FIG. 9, the control unit 140 may separate a red hologram data component $CGH_r$, a green hologram data component $CGH_g$, and a blue hologram data component $CGH_b$ from the original hologram data signal CGH that does not consider chromatic dispersion. Thereafter, the control unit 140 may generate a new red hologram data component $CGH_r'$ to correct a location of a red hologram image in the red hologram data component $CGH_r$, and a new blue hologram data component $CGH_b'$ to correct a location of a blue hologram image in the blue hologram data component $CGH_b$. For example, the locations of the red and blue hologram images, respectively, in the corrected hologram data component $CGH_r'$ and the corrected blue hologram data component $CGH_b'$ may be moved according to in Equation 6 below compared to the original hologram data signal CGH:

$$x_{shift} = -\frac{d}{\Lambda_x}\Delta\lambda, \quad y_{shift} = -\frac{d}{\Lambda_y}\Delta\lambda \quad \text{[Equation 6]}$$

In Equation 6 above, $\Lambda x$ and $\Lambda y$ denote periods of the diffraction pattern, and d denotes a depth of a hologram image, that is, a distance between the spatial light modulator 120 and a hologram image plane. $\Delta\lambda$ denotes a difference between a wavelength that is a reference for determining the period of the diffraction pattern and a wavelength of a color of the hologram image that is to be corrected. For example, if it is assumed that the period of the diffraction pattern is determined based on a green wavelength, when the location of the red hologram image is corrected, $\Delta\lambda$ may be the difference between a red wavelength and the green wavelength. In Equation 6, a negative (−) sign indicates that an image is moved in a direction opposite to chromatic dispersion.

Finally, the control unit 140 may combine the corrected hologram data component $CGH_r'$ and the corrected blue hologram data component $CGH_b'$ again to generate a new hologram data signal CGH'. The control unit 140 may generate a diffraction pattern data signal Pg based on the green wavelength and the corrected hologram data signal CGH' and the diffraction pattern data signal Pg to the spatial light modulator 120. For example, a final signal provided by the control unit 140 to the spatial light modulator 120 may be expressed as a multiplication CGH' X Pg of the corrected hologram data signal CGH' and the diffraction pattern data signal Pg.

The spatial light modulator 120 may form and display a hologram pattern and a diffraction pattern from the corrected hologram data signal CGH' and the diffraction pattern data signal Pg. In this regard, the hologram pattern formed by the spatial light modulator 120 may offset chromatic dispersion of the red hologram image by moving the red hologram image in a direction opposite to the chromatic dispersion of the red hologram image at a depth in which the hologram image is reproduced. The hologram pattern may offset chromatic dispersion of the blue hologram image by moving the blue hologram image in a direction opposite to the chromatic dispersion of the blue hologram image at the depth in which the hologram image is reproduced. Accordingly, no chromatic dispersion may occur although the hologram image is moved by using the diffraction pattern having one period.

When preventing chromatic dispersion from occurring as described above, chromatic dispersion may be exactly offset only at the depth in which the hologram image is reproduced and may occur in other regions. The greater the chromatic dispersion, the farther away from the depth in which the hologram image is reproduced. Thus, when an eye lens (e.g., pupil) of an observer is focused on the depth in which the hologram image is reproduced, chromatic dispersion may not be seen by the observer, and, when the eye lens of the observer is focused before and after the depth in which the hologram image is reproduced, chromatic dispersion may be seen by the observer. If the eye lens is focused farther away from the depth in which the hologram image is reproduced, chromatic dispersion may be better seen by the observer, which is the same as an out-focusing effect of a camera. As described above, an accommodation effect may be further provided to the observer.

Meanwhile, mathematically computed hologram data may be expressed as a complex function according to Equation 7 below:

$$CGH(x,y) = Re(x,y) + j\,Im(x,y) \quad \text{[Equation 7]}$$

In Equation 7 above, Re(x,y) denotes a real part, and Im(x,y) denotes an imaginary part. When the hologram data is represented on a complex plane defining a horizontal axis as the real part and a vertical axis as the imaginary part, the hologram data may have an amplitude component that is a distance from an original point and a phase component that is an angle from the horizontal axis. Thus, when the spatial light modulator 120 is a complex modulator capable of performing both amplitude modulation and phase modulation, all components of the mathematically computed hologram data may represent the hologram pattern without loss.

Meanwhile, when the spatial light modulator 120 is an amplitude modulator capable of performing only amplitude modulation, only the real part of the mathematically computed hologram data may be inevitably used to represent the hologram pattern. A negative (−) value may be generated in the real part during an encoding process of generating the hologram data signal and the diffraction pattern data signal. The amplitude modulator may not express a negative amplitude. In this regard, when the spatial light modulator 120 is the amplitude modulator capable of performing only amplitude modulation, amplitude of the real part may be generally increased such that the negative value may not be generated. Thus, an image region that should be dark in a reproduced hologram image may be partially bright. As a result, a contrast ratio (CR) of the reproduced hologram image may be reduced.

Figure 10A:
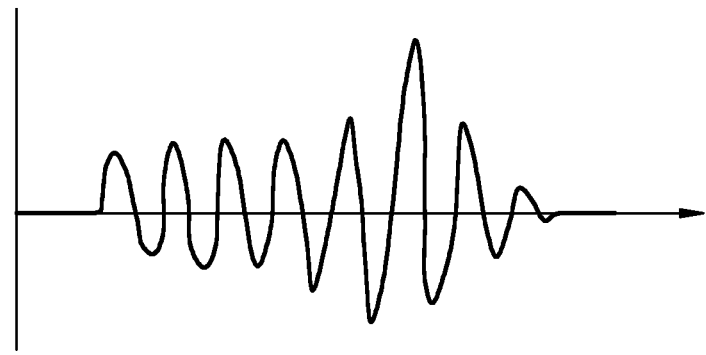
FIGS. 10A, 10B, 10C and 10D illustrate exemplary graphs for describing a holographic display method of adjusting an amplitude modulation value of a spatial light modulator in order to prevent a contrast ratio (CR) from being reduced when the spatial light modulator is an amplitude modulator according to an exemplary embodiment.
Figure 10B:
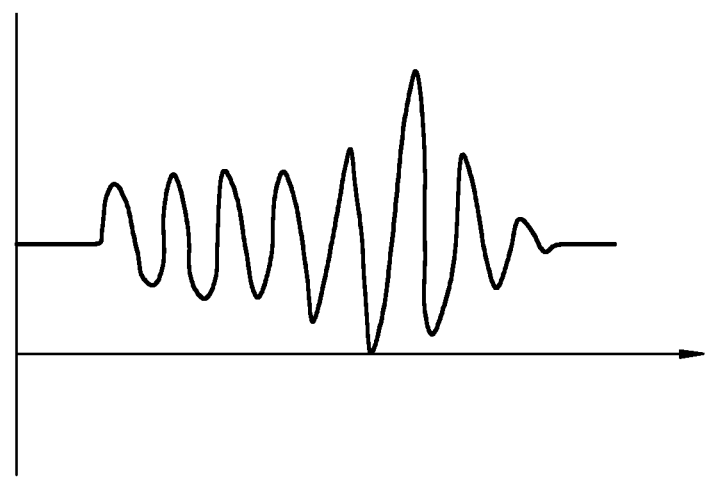

FIGS. 10A through 10D are exemplary graphs for describing a holographic display method of adjusting an amplitude modulation value of the spatial light modulator 120 in order to prevent a contrast ratio (CR) from being reduced when the spatial light modulator 120 is an amplitude modulator capable of performing amplitude modulation according to an exemplary embodiment. The graph of FIG. 10A shows an exemplary value of a real part of hologram data including diffraction pattern data, in which a vertical axis indicates a gray value (e.g., an amplitude modulation value) of a hologram pattern that is to be formed on the spatial light modulator 120, and a horizontal value indicates a location of the hologram pattern that is to be formed on the spatial light modulator 120. As shown in FIG. 10A, the mathematically computed hologram data has a negative amplitude that may not be expressed by a general amplitude modulator. As shown in the graph of FIG. 10B, the related art may generally increase an amplitude of the real part such that the negative amplitude may not be generated, and thus a region that should have 0 as the gray value may be bright.

Figure 10C:
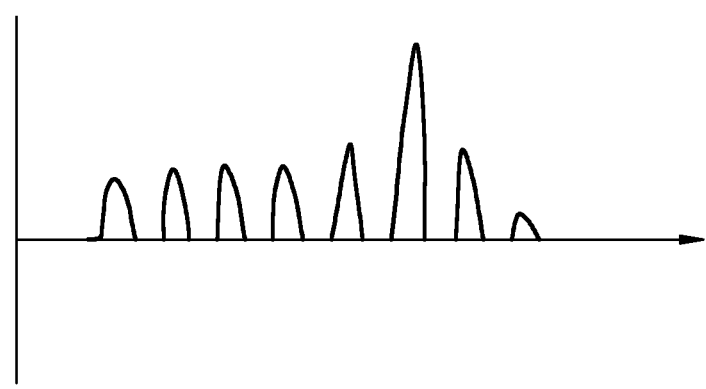
Figure 10D:
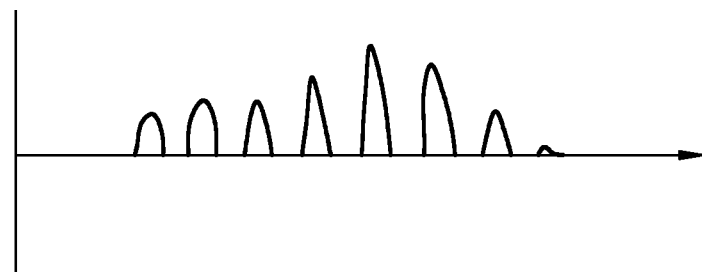

According to the present exemplary embodiment, as shown in the graphs of FIGS. 10C and 10D, only one of a positive amplitude part and a negative amplitude part may be selected in the real part of the hologram data expressed as a complex number. For example, as shown in FIG. 10C, the positive amplitude part may be selected in the real part of the hologram data, and the real part of the hologram data that is not selected may be processed as 0. The control unit 140 may use the processed hologram data to generate and provide a hologram data signal to the spatial light modulator 120. As shown in FIG. 10D, the control unit 120 may select the negative amplitude part in the real part of the hologram data and process the real part of the hologram data that is not selected as 0. The control unit 140 may provide an absolute value of the selected real part of the hologram data to the spatial light modulator 120 as the amplitude modulation value.

The control unit 140 may use both negative and positive amplitudes of the real part of the hologram data in a time divisional way. For example, the control unit 140 may select the positive amplitude part and process the negative amplitude part as 0 as shown in FIG. 10C while reproducing a hologram image of a first frame. The control unit 140 may select the negative amplitude part and process the positive amplitude part as 0 as shown in FIG. 10D while reproducing a hologram image of a second frame subsequent to the first frame. As described above, the control unit 140 may alternately select the positive amplitude part and the negative amplitude part over time to generate the hologram data signal.

According to the description provided above, a region having the gray value closer to 0 may not be forced to increase a gray value to be higher, and thus, the CR may be increased. If the positive amplitude part and the negative amplitude part are alternately used, an effect of preventing black lines of a diffraction pattern from being seen to the naked eye of an observer may be further obtained. Moreover, according to the description provided above, a sticky phenomenon of a panel of the spatial light modulator 140 may be reduced. The sticky phenomenon is that noise occurs during an operation of a next frame since liquid crystals are sticky when the same signals are continuously input into a same region of the panel.

Figure 11:
FIG. 11 is an exemplary graph showing a result of removing a high spatial frequency component by using a low pass filter in the graph of FIG. 10C.

Meanwhile, in the graphs of FIGS. 10C and 10D, a region having an amplitude other than 0 and a region having an amplitude of 0 may be discontinuous, which may cause noise in a reproduced hologram image. Thus, to smoothly connect the region having an amplitude other than 0 and the region having an amplitude of 0, a low pass filter may be used to remove a high spatial frequency component. For example, FIG. 11 is an exemplary graph showing a result of removing a high spatial frequency component by using a low pass filter in the graph of FIG. 10C. To this end, the control unit 140 may remove the high spatial frequency component of an amplitude value extracted from hologram data by using the low pass filter before providing the extracted amplitude value to the spatial light modulator 120. That is, the control unit 140 may alternately select a positive amplitude part and a negative amplitude part over time to generate a hologram data signal, process the hologram data signal by using the low pass filter, and provide the processed hologram data signal to the spatial light modulator 120. In this regard, the low pass filter may be a physical filter, a logical filter realized as software or electronic circuit instead of a physical filter, or a combination thereof.

In FIGS. 10A through 11, an imaginary part of mathematically computed hologram data may not be reflected. Even when the spatial light modulator 120 is an amplitude modulator, the amplitude modulation value of the spatial light modulator 120 may be adjusted such that a CR may not be reduced while reflecting the imaginary part of the hologram data.

Figure 12:
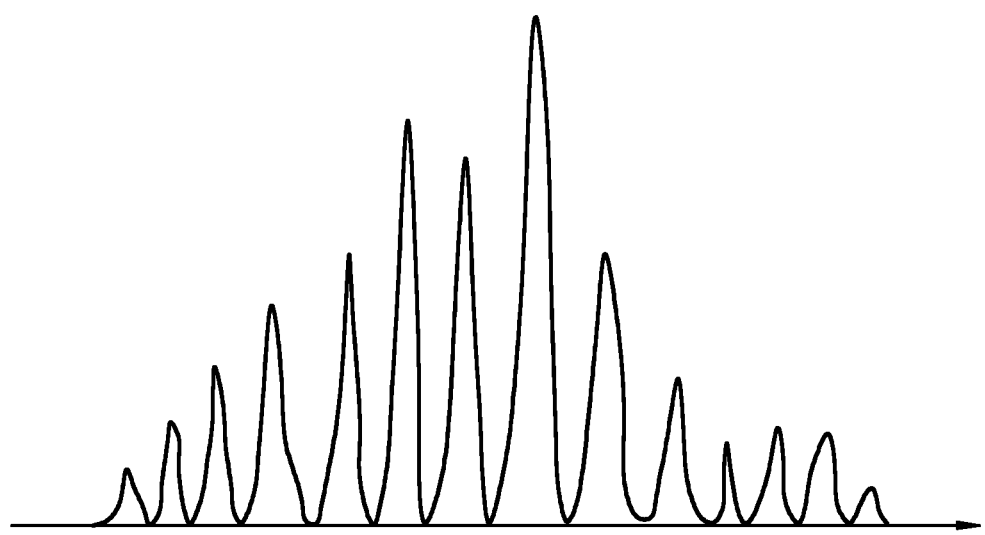
FIG. 12 is an exemplary graph for describing a holographic display method of adjusting an amplitude modulation value of a spatial light modulator by not reducing a CR while reflecting an imaginary part of hologram data even when the spatial light modulator is an amplitude modulator according to another exemplary embodiment.

FIG. 12 is an exemplary graph for describing a holographic display method of adjusting an amplitude modulation value of the spatial light modulator 120 by not reducing a CR while reflecting an imaginary part of hologram data even when the spatial light modulator 120 is an amplitude modulator according to another exemplary embodiment. For example, the graph of FIG. 12 shows a result (e.g., Re(CGH)+Abs(CGH)) of summing a value of a real part of the hologram data expressed as a complex number and an absolute value of the hologram data. Referring to the graph of FIG. 12, a negative amplitude modulation value may not be generated, a curve may be smoothly connected near a part of which a gray value is 0, and thus, additional post-processing shown in FIGS. 10A through 11 may be unnecessary. The gray value may remain as 0 in a location in which the gray value should be 0 on the spatial light modulator 120. Thus, no scattering occurs due to an offset of the gray value in the location in which the gray value should be 0, thereby preventing the CR from being reduced.

Although FIG. 12 shows the exemplary graph of summing the value of the real part of the hologram data expressed as the complex number and the absolute value of the hologram data, the imaginary part of the hologram data may be reflected in a different way. That is, various combinations of the real part, the imaginary part, and the absolute part of the hologram data may be possible. For example, the amplitude modulation value calculated by the control unit 140 may be a sum (e.g., Im(CGH)+Abs(CGH)) of the absolute value of the hologram data expressed as the complex number and a value of the imaginary part of the hologram data. That is, the control unit 140 may sum the absolute value of the hologram data and the value of the imaginary part of the hologram data to generate and provide a hologram data signal to the spatial light modulator 120.

The control unit 140 may also calculate the amplitude modulation value according to Equation 8 below:

$$\alpha_1 * \text{Re}(CGH) + \alpha_2 * \text{Im}(CGH) + \alpha_3 * \text{Abs}(CGH)$$ [Equation 8]

That is, the amplitude modulation value may be calculated by adding a multiplication of the value of the real part of the hologram data expressed as the complex number and a first coefficient $\alpha 1$, a multiplication of the value of the imaginary part of the hologram data and a second coefficient $\alpha 2$, and a multiplication of the absolute value of the hologram data and a third coefficient $\alpha 3$. In this regard, the third coefficient $\alpha 3$ may have a value other than 0, and values of the first and second coefficients $\alpha 1$ and $\alpha 2$ may be selected such that the amplitude modulation value may be greater than 0 in all coordinates on the spatial light modulator 120.

To facilitate understanding of the exemplary embodiments, certain exemplary embodiments of holographic display apparatuses and holographic display methods that provide enhanced image quality have been described and shown in the accompanying drawings. However, it should be understood that the certain exemplary embodiments are merely intended to illustrate the exemplary embodiments and not to limit the exemplary embodiments. It should be also understood that the exemplary embodiments are not limited to the illustrated and described exemplary embodiments. Various modifications may be made to the exemplary embodiments by those of ordinary skill in the art.

What is claimed is:

1. A controller for a holographic display apparatus comprising a spatial light modulator, the controller comprising a processor configured to:

generate a first frame hologram data signal comprising information of a first frame hologram pattern for reproducing a first frame hologram image for a first frame and a first frame diffraction pattern data signal comprising information of a first frame periodic diffraction pattern for adjusting a location of the first frame hologram image to be reproduced;

generate a first final signal comprising the first frame hologram data signal and the first frame diffraction pattern data signal;

provide the first final signal to the spatial light modulator;

generate a second frame hologram data signal comprising information of a second frame hologram pattern for reproducing a second frame hologram image for a second frame and a second frame diffraction pattern data signal comprising information of a second frame periodic diffraction pattern for adjusting a location of the second frame hologram image to be reproduced;

generate a second final signal comprising the second frame hologram data signal and the second frame diffraction pattern data signal; and provide the second final signal to the spatial light modulator, wherein the processor is further configured to generate the first frame diffraction pattern data signal and the second frame diffraction pattern data signal such that a location of the second frame periodic diffraction pattern formed on the spatial light modulator in the second frame is moved along a predetermined direction compared to a location of the first frame periodic diffraction pattern formed on the spatial light modulator in the first frame, wherein each of the first frame hologram image and the second frame hologram image comprises a first color image, a second color image, and a third color image, the first color image, the second color image and the third color image having different colors from each other, wherein each of the first frame periodic diffraction pattern and the second frame periodic diffraction pattern comprises a first periodic diffraction pattern for adjusting a location of the first color image, a second periodic diffraction pattern for adjusting a location of the second color image, and a third periodic diffraction pattern for adjusting a location of the third color image, the first periodic diffraction pattern, the second periodic diffraction pattern, and the third periodic diffraction pattern having different periods from each other, and wherein the processor is further configured to move the first frame periodic diffraction pattern and the second frame periodic diffraction pattern along the predetermined direction by respective distances that are less than a lowest common multiple of a period of the first periodic diffraction pattern, a period of the second periodic diffraction pattern, and a period of the third periodic diffraction pattern.

2. The controller of claim 1, wherein the processor is further configured to set the period of the first periodic diffraction pattern, the period of the second periodic diffraction pattern, and the period of the third periodic diffraction pattern to be proportional to a wavelength of light of a first color, a wavelength of light of a second color, and a wavelength of light of a third color, respectively.

3. The controller of claim 1, wherein the processor is further configured to:

generate an Nth frame hologram data signal comprising information of an Nth frame hologram pattern for reproducing an Nth frame hologram image for an Nth frame and an Nth frame diffraction pattern data signal comprising information of an Nth frame periodic diffraction pattern for adjusting a location of the Nth frame hologram image to be reproduced, N being an integer;

generate an Nth final signal comprising the Nth frame hologram data signal and the Nth frame diffraction pattern data signal; and provide the Nth final signal to the spatial light modulator, wherein the processor is further configured to generate the Nth frame diffraction pattern data signal such that a location of the Nth frame periodic diffraction pattern formed on the spatial light modulator in the Nth frame is moved along the predetermined direction compared to the location of the second frame periodic diffraction pattern formed on the spatial light modulator in the second frame.

4. The controller of claim 3, wherein the processor is configured to move the first through Nth frame periodic diffraction patterns along the predetermined direction by respective distances that are selected as multiples of a value obtained by dividing the lowest common multiple of the period of the first periodic diffraction pattern, the period of the second periodic diffraction pattern, and the period of the third periodic diffraction pattern into N equal parts.

5. The controller of claim 3, wherein the processor is configured to:

determine the location of the first frame periodic diffraction pattern formed on the spatial light modulator in the first frame based on a first phase of a prism grating function for generating the first frame diffraction pattern data signal;

determine the location of the second frame periodic diffraction pattern formed on the spatial light modulator in the second frame based on a second phase of the prism grating function for generating the second frame diffraction pattern data signal; and determine the location of the Nth frame periodic diffraction pattern formed on the spatial light modulator in the Nth frame based on an Nth phase of the prism grating function for generating the Nth frame diffraction pattern data signal.

6. The controller of claim 5, wherein the first phase of the prism grating function for generating the first frame diffraction pattern data signal, the second phase of the prism grating function for generating the second frame diffraction pattern data signal, and the Nth phase of the prism grating function for generating the Nth frame diffraction pattern data signal are different from each other.

7. The controller of claim 6, wherein the processor is further configured to sequentially change the first through Nth phases of the prism grating functions while sequentially reproducing the first through Nth frame hologram images.

8. The controller of claim 6, wherein the processor is further configured to irregularly change the first through Nth phases of the prism grating functions while sequentially reproducing the first through Nth frame hologram images.

9. The controller of claim 1, wherein the processor is further configured to generate the first final signal by multiplying the first frame hologram data signal by the first frame diffraction pattern data signal and generate the second final signal by multiplying the second frame hologram data signal by the second frame diffraction pattern data signal.

10. A method of generating a data signal for a holographic display apparatus comprising:

generating a first frame hologram data signal comprising information of a first frame hologram pattern for reproducing a first frame hologram image for a first frame and a first frame diffraction pattern data signal comprising information of a first frame periodic diffraction pattern for adjusting a location of the first frame hologram image to be reproduced;

generating a first final signal comprising the first frame hologram data signal and the first frame diffraction pattern data signal;

generating a second frame hologram data signal comprising information of a second frame hologram pattern for reproducing a second frame hologram image for a second frame and a second frame diffraction pattern data signal comprising information of a second frame periodic diffraction pattern for adjusting a location of the second frame hologram image to be reproduced; and generating a second final signal comprising the second frame hologram data signal and the second frame diffraction pattern data signal, wherein the first frame diffraction pattern data signal and the second frame diffraction pattern data signal are generated such that a location of the second frame periodic diffraction pattern formed on a spatial light modulator while the second frame hologram image is being reproduced in the second frame is moved along a predetermined direction compared to a location of the first frame periodic diffraction pattern formed on the spatial light modulator while the first frame hologram image is being reproduced in the first frame, wherein each of the first frame hologram image and the second frame hologram image comprises a first color image, a second color image, and a third color image, the first color image, the second color image and the third color image having different colors from each other, wherein each of the first frame periodic diffraction pattern and the second frame periodic diffraction pattern comprises a first periodic diffraction pattern for adjusting a location of the first color image, a second periodic diffraction pattern for adjusting a location of the second color image, and a third periodic diffraction pattern for adjusting a location of the third color image, the first periodic diffraction pattern, the second periodic diffraction pattern, and the third periodic diffraction pattern having different periods from each other, and wherein the first frame periodic diffraction pattern and the second frame periodic diffraction pattern are moved along the predetermined direction by respective distances that are less than a lowest common multiple of a period of the first periodic diffraction pattern, a period of the second periodic diffraction pattern, and a period of the third periodic diffraction pattern.

11. The method of claim 10, wherein the period of the first periodic diffraction pattern, the period of the second periodic diffraction pattern, and the period of the third periodic diffraction pattern are proportional to a wavelength of light of a first color, a wavelength of light of a second color, and a wavelength of light of a third color, respectively.

12. The method of claim 10 further comprising:

generating an Nth frame hologram data signal comprising information of an Nth frame hologram pattern for reproducing an Nth frame hologram image for an Nth frame and an Nth frame diffraction pattern data signal comprising information of an Nth frame periodic diffraction pattern for adjusting a location of the Nth frame hologram image to be reproduced, N being an integer; and generating an Nth final signal comprising the Nth frame hologram data signal and the Nth frame diffraction pattern data signal, wherein the Nth frame diffraction pattern data signal is generated such that a location of the Nth frame periodic diffraction pattern formed on the spatial light modulator while the Nth frame hologram image is being reproduced in the Nth frame is moved along the predetermined direction compared to the location of the second frame periodic diffraction pattern formed on the spatial light modulator in the second frame.

13. The method of claim 12, wherein the first through Nth frame periodic diffraction patterns are moved along the predetermined direction by respective distances that are selected as multiples of a value obtained by dividing the lowest common multiple of the period of the first periodic diffraction pattern, the period of the second periodic diffraction pattern, and the period of the third periodic diffraction pattern into N equal parts.

14. The method of claim 12, wherein the location of the first frame periodic diffraction pattern formed on the spatial light modulator in the first frame is determined based on a first phase of a prism grating function for generating the first frame diffraction pattern data signal, wherein the location of the second frame periodic diffraction pattern formed on the spatial light modulator in the second frame is determined based on a second phase of the prism grating function for generating the second frame diffraction pattern data signal, and wherein the location of the Nth frame periodic diffraction pattern formed on the spatial light modulator in the Nth frame is determined based on an Nth phase of the prism grating function for generating the Nth frame diffraction pattern data signal.

15. The method of claim 14, wherein the first phase of the prism grating function for generating the first frame diffraction pattern data signal, the second phase of the prism grating function for generating the second frame diffraction pattern data signal, and the Nth phase of the prism grating function for generating the Nth frame diffraction pattern data signal are different from each other.

16. The method of claim 15, wherein the first through Nth phases of the prism grating functions are sequentially changed while sequentially reproducing the first through Nth frame hologram images.

17. The method of claim 15, wherein the first through Nth phases of the prism grating functions are irregularly changed while sequentially reproducing the first through Nth frame hologram images.

18. The method of claim 10, wherein the first final signal is generated by multiplying the first frame hologram data signal by the first frame diffraction pattern data signal and the second final signal is generated by multiplying the second frame hologram data signal by the second frame diffraction pattern data signal.

19. A non-transitory computer-readable recording medium having recorded thereon a program which is executable by a processor to perform the method of claim 10.

\* \* \* \* \*